UNITED STATES PATENT OFFICE.

ELMER G. KIMMICH, OF AKRON, OHIO, ASSIGNOR TO THE GOODYEAR TIRE & RUBBER COMPANY, OF AKRON, OHIO, A CORPORATION OF OHIO.

METHOD OF CURING HOSE.

1,365,327.     Specification of Letters Patent.     Patented Jan. 11, 1921.

No Drawing. Application filed February 26, 1920, Serial No. 361,393. Renewed November 30, 1920. Serial No. 427,459.

*To all whom it may concern:*

Be it known that I, ELMER G KIMMICH, a citizen of the United States, and resident of Akron, Ohio, have invented new and useful Improvements in Methods of Curing Hose, of which the following is a specification.

The present invention relates to improvements in the art of vulcanizing and more particularly to improved methods of curing hose or the like.

Various methods of curing or vulcanizing hose have been developed two of which, the "mold cure" and the "wrap cure" are most commonly used.

Referring to the former method the green hose or other article is usually inflated by air pressure, placed in a sectional mold, and cured or vulcanized in this condition, although in certain instances a mandrel is inserted within the hose in place of the air pressure.

In the practice of the latter method the green hose, or other article, usually built up of layers of rubber and fabric is wrapped helically with a strip of fabric, and usually the wrapping is applied in layers, or cross-wrapped. This wrapping step is in some instances performed while the hose is mounted upon a mandrel and in others while it is inflated by air pressure. In either instance it is cured by subjecting it to the process of vulcanization in an oven or open heater, without being inclosed in a mold.

In the practice of either of the above described methods where the article is cured "on air," that is, while inflated by air pressure, owing to the character of the green rubber, it has been found impossible to use the proper degree of air pressure within the hose necessary to produce the required adhesion between the layers of the article during vulcanization. This lack of proper pressure within the article being cured results in the production of an imperfect article, wherein the layers, particularly the outer layers, tend to separate from each other during use.

It is the primary object of the present invention to provide a method through the practice of which hose or other hollow articles either when wrapped or positioned in a mold may be cured in a manner positively insuring the proper degree of adhesion between all layers thereof, and wherein gradual compression of the several layers of the article may be effected during the curing operation.

Other advantages together with the practicability and utility of the method will become readily apparent when the following description is read, it being understood that while certain preferred steps and procedure have been disclosed therein as illustrative of the method, other proceedings may be resorted to without departing from the spirit of the invention or the scope of the appended claims.

In the preferred practice of the present method, air under pressure is first introduced into the interior of the hose or article to inflate the same. A wrapping is then applied to the article throughout the length thereof. The wrapping may be either applied as a single layer of convolutely wound fabric, or a helically wound cross-wrapping may be used as previously described.

The degree of pressure within the hose is of course regulated in accordance with the structure and quality of the hose and the wrapping should be applied with a certain amount of tension. However, as before stated, the use of the high degree of air pressure necessary to procure the proper effect during vulcanization is impossible within an article composed chiefly of green rubber, consequently the desired amount of tension cannot be applied upon the wrapper at this stage of the method owing to the lack of resistance within the article.

The article prepared in the above described manner is then placed in a heating oven and subjected to the curing or vulcanizing process.

As the curing process progresses the pressure of the air within the hose is increased by degrees and preferably while the article remains in the curing or vulcanizing apparatus, thus increasing the tension upon the wrapper and forcing the layers of the article together at certain stages of the cure.

By thus gradually increasing the pressure within the hose the process of curing progresses while the layers of the article are under different degrees of compression, whereby each layer is more affected by the action of the heat which result would otherwise not occur if they were suddenly compressed together by abruptly increased pressure. Of course, the increasing pressures which are applied during the curing by my method are in addition to any slight increases in pressure which might normally occur by reason of the heat applied during the vulcanizing operation.

If desired, different procedures other than wrapping may be adopted for confining the hose, such for instance as the use of a mold, or jacketing the hose with a coating of lead, or various other expedients some of which are commonly known in the art.

The essential steps of the present method, however, are the expansion of the article which may be by the introduction of pressure and the increase of such pressure within the article during the vulcanizing or curing process. However, as the step of introducing the initial pressure, before placing the article in the oven is important principally in order to properly apply the wrapping, it is obvious that it may be omitted if desired when curing articles of a certain type upon which no wrapping is applied.

No particular apparatus has been indicated for use in the practice of the present method, it being understood that any of the several types of devices used at the present time, in the hose making art, as well as other apparatus may be utilized in performing the steps of the method.

What I claim is:

1. The method of treating hollow articles having a body portion including rubber composition, which includes the following steps, (a) confining the article to limit the expansion thereof, and, (b) introducing a gradually increasing pressure into the interior of the article, while said article thus confined is being subjected to the action of heat.

2. The method of treating hollow articles having a body portion including rubber composition, which includes the following steps; (a) confining the article by flexible means, and, (b) introducing a gradually increasing pressure into the interior of the article while said article thus confined is being subjected to the action of heat.

3. The method of treating hollow articles having a body portion including rubber composition, which includes the following steps, (a) incasing the article to limit the expansion thereof, and, (b) introducing a gradually increasing pressure into the interior of the article, while said article thus incased is being subjected to the action of heat.

4. The method of treating hollow articles having a body portion including rubber composition, which includes the steps, (a) confining the article to limit the expansion thereof, by applying a flexible wrapping around said article, and, (b) introducing a gradually increasing pressure into the interior of the article while said article in its wrapped condition is being subjected to the action of heat.

5. The method of treating hollow articles formed partially of rubber composition, which includes the following steps, (a) applying a fabric wrapping about the article to limit the expansion thereof, and, (b) introducing a gradually increasing pressure into the interior of the article, while said wrapped article is being subjected to the action of heat.

6. The method of treating flexible hollow articles formed partially of rubber composition, which includes the following steps, (a) introducing fluid under pressure into the interior of the article to inflate said article, (b) confining the inflated article to limit the expansion thereof, and (c) increasing the degree of fluid pressure within the article while said article in its confined state is being subjected to the action of heat.

7. The method of treating flexible hollow articles embodying rubber composition, which includes the following steps, (a) introducing fluid under pressure into the interior of the article to inflate said article, (b) applying a flexible wrapping about the article to limit the expansion thereof, and, (c) increasing the degree of fluid pressure within the article while said article in its confined state is being subjected to the action of heat.

8. The method of treating flexible hollow articles embodying rubber composition, which includes the following steps, (a) introducing fluid under pressure into the interior of the article to inflate said article, (b) applying a helical wrapping of fabric around the article to limit the expansion thereof, and (c) increasing the degree of fluid pressure within the wrapped article while said wrapped article is being subjected to the action of heat.

9. The method of treating flexible hollow articles embodying rubber composition, which includes the following steps, (a) introducing means into the interior of the article to provide a resistance against compression of said article, (b) confining the article to limit expansion thereof, (c) subjecting the article, thus confined and prepared against compression, to the action of heat, and, (d) introducing a gradually increasing pressure into the interior of the article.

10. The method of treating flexible hollow articles embodying rubber composition, which includes the following steps, (a) introducing means into the interior of the article to provide a resistance against compression, (b) applying a wrapping of fabric to the article, (c) subjecting the article, thus confined and prepared against compression, to the action of heat, (*d*) introducing fluid under pressure into the interior of the article while said article is being acted upon by the heat, and, (*e*) increasing the pressure by degrees.

In witness whereof, I have hereunto signed my name in the presence of two subscribing witnesses.

ELMER G. KIMMICH.

Witnesses:
J. E. KEATING,
E. C. LEADENHAM.